United States Patent
Chou et al.

(10) Patent No.: US 8,229,617 B2
(45) Date of Patent: *Jul. 24, 2012

(54) INTERACTIVE GUIDE TOY VEHICLE APPARATUS

(75) Inventors: Li-Der Chou, Taoyuan County (TW); Chen-Ming Lin, Taipei County (TW)

(73) Assignee: National Central University, Taoyuan County (TW)

( * ) Notice: Subject to any disclaimer, the term of this patent is extended or adjusted under 35 U.S.C. 154(b) by 1099 days.

This patent is subject to a terminal disclaimer.

(21) Appl. No.: 12/124,508

(22) Filed: May 21, 2008

(65) Prior Publication Data

US 2009/0136911 A1 May 28, 2009

(30) Foreign Application Priority Data

Nov. 22, 2007 (TW) .............................. 96144235 A

(51) Int. Cl.
*G01C 22/00* (2006.01)
(52) U.S. Cl. ........................................................ 701/23
(58) Field of Classification Search .............. 434/307 R, 434/365; 446/409; 701/23, 25, 28
See application file for complete search history.

(56) References Cited

U.S. PATENT DOCUMENTS

| | | | | |
|---|---|---|---|---|
| 6,246,933 B1 * | 6/2001 | Bague | ............................. | 701/35 |
| 6,322,415 B1 * | 11/2001 | Cyrus et al. | ................... | 446/130 |
| 6,374,155 B1 * | 4/2002 | Wallach et al. | ............... | 700/245 |
| 6,438,472 B1 * | 8/2002 | Tano et al. | ....................... | 701/35 |
| 6,470,235 B2 * | 10/2002 | Kasuga et al. | ................ | 700/246 |
| 7,542,835 B2 * | 6/2009 | Takahama et al. | ............... | 701/45 |
| 7,561,054 B2 * | 7/2009 | Raz et al. | ....................... | 340/576 |
| 7,619,668 B2 * | 11/2009 | Saka et al. | ...................... | 348/251 |
| 7,671,725 B2 * | 3/2010 | Tsuji et al. | ..................... | 340/435 |
| 7,676,306 B2 * | 3/2010 | Kubo et al. | ..................... | 701/35 |
| 7,788,027 B2 * | 8/2010 | Jones | ............................. | 701/207 |
| 7,843,431 B2 * | 11/2010 | Robbins et al. | ............... | 345/161 |
| 7,899,211 B2 * | 3/2011 | Fujimoto | ....................... | 382/104 |
| 2004/0199325 A1 * | 10/2004 | Kishigami | ..................... | 701/210 |
| 2005/0102098 A1 * | 5/2005 | Montealegre et al. | ........ | 701/209 |
| 2006/0276964 A1 * | 12/2006 | Sano | ............................. | 701/300 |
| 2007/0093945 A1 * | 4/2007 | Grzywna et al. | ................ | 701/23 |
| 2009/0281725 A1 * | 11/2009 | Sakata | .......................... | 701/208 |

FOREIGN PATENT DOCUMENTS

JP 2007047875 A * 2/2007

* cited by examiner

*Primary Examiner* — Kesha Y. Frisby
(74) *Attorney, Agent, or Firm* — Jackson IPG PLLC

(57) ABSTRACT

A guide toy vehicle is used for obtaining related knowledge of exhibit in a pleasant and interactive way. Guidance materials are transferred between different guidance systems through a wireless network. Thus, a user can have a wide, easy and effective learning.

15 Claims, 6 Drawing Sheets

INTERACTIVE GUIDE TOY VEHICLE APPARATUS

FIELD OF THE INVENTION

The present invention relates to a guide toy vehicle; more particularly, relates to integrating exhibition center services in a single platform for providing services during guidance with the guide toy vehicle without going to actual positions.

DESCRIPTION OF THE RELATED ART

Traditional learning methods change much following developments of the Internet. Learning is no longer limited in classroom, not even limited in time and space. Different ideas and operations have sprung out through using network technologies. On comparing to the traditional learning methods, a new model is set by the learning methods through using network technologies. The learning activities focus more on learning but teaching.

General guidance systems are basically only designed for qualified visitors. Yet, age limits on visitors may trouble people most; and, thus, not all visitors can learn related knowledge by visiting desired exhibits. Besides, related guidance materials are mostly standardized and not revisable for enrichment. In addition, different guidance materials in different guidance systems generally can not be shared in between, which forms a learning obstacle on obtaining new knowledge for learners. As a result, without effective guidance and help, learners may obtain different learning effects biased from the target effects originally designed. Hence, the prior arts do not fulfill all users' requests on actual use.

SUMMARY OF THE INVENTION

The main purpose of the present invention is to learn knowledge through a multimedia mobile learning guidance system for achieving planed learning objects.

The second purpose of the present invention is to further understand material to be learned in a happy and pleasant mood.

The third purpose of the present invention is to integrate exhibition center services in a single platform for providing services during guidance without going to actual positions.

To achieve the above purposes, the present invention is an interactive guide toy vehicle apparatus, comprising a scene model, a vehicle model, a guidance system model, a service model, where at least one exhibit unit is placed along a manually-constructed track on a map of the scene model; a route is self-built with a track unit; after a guiding route is planned, a guide toy vehicle of the vehicle model is controlled through a wireless network to move along the track unit on the map after the guide toy vehicle arrives at the destination, a positioning system is used by the guiding system through wireless techniques such as RFID and infrared techniques to obtain a relationship set by the service model at back-end for obtaining a guidance material; and the guidance material is presented by the guidance system model through a wireless network unit. Accordingly, a novel interactive guide toy vehicle apparatus is obtained

BRIEF DESCRIPTION OF THE DRAWINGS

The present invention will be better understood from the following detailed descriptions of the preferred embodiments according to the present inventions taken in conjunction with the accompanying drawings, in which.

DESCRIPTIONS OF THE PREFERRED EMBODIMENTS

The following descriptions of the preferred embodiments are provided to understand the features and the structures of the present invention.

Figure 1:
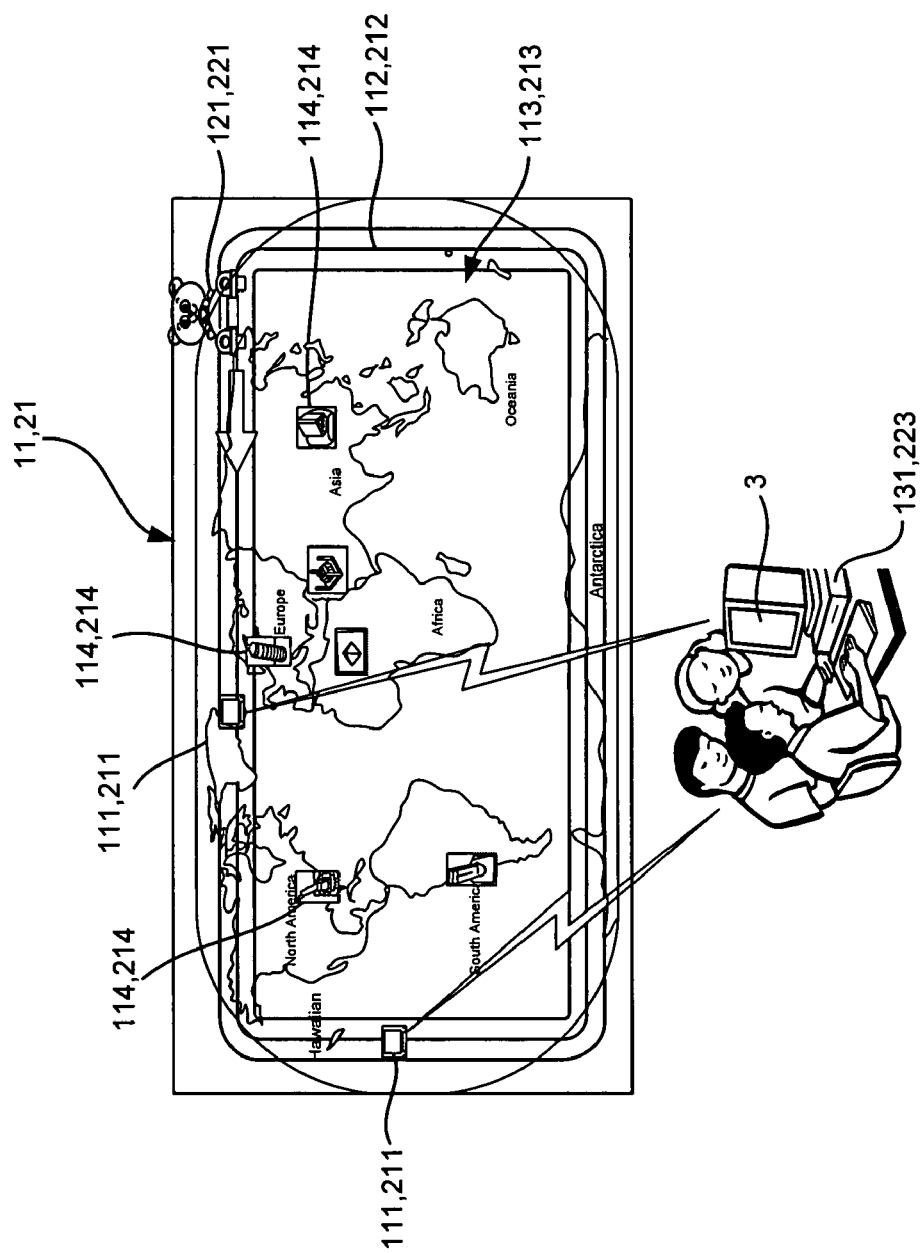
FIG. 1 is the view showing the state of use according to the present invention.
Figure 2:
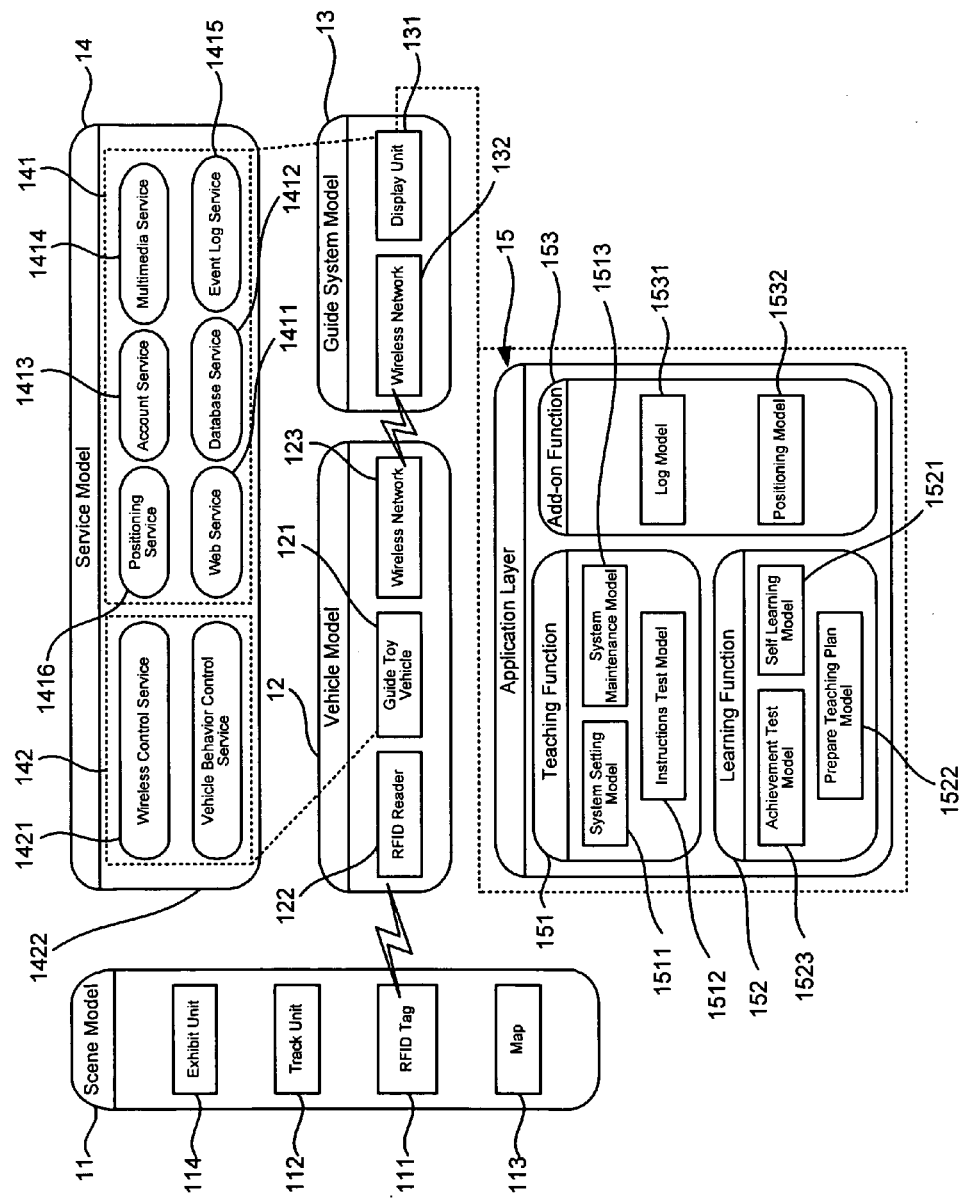
FIG. 2 is the structural view showing the first preferred embodiment.
Figure 3:
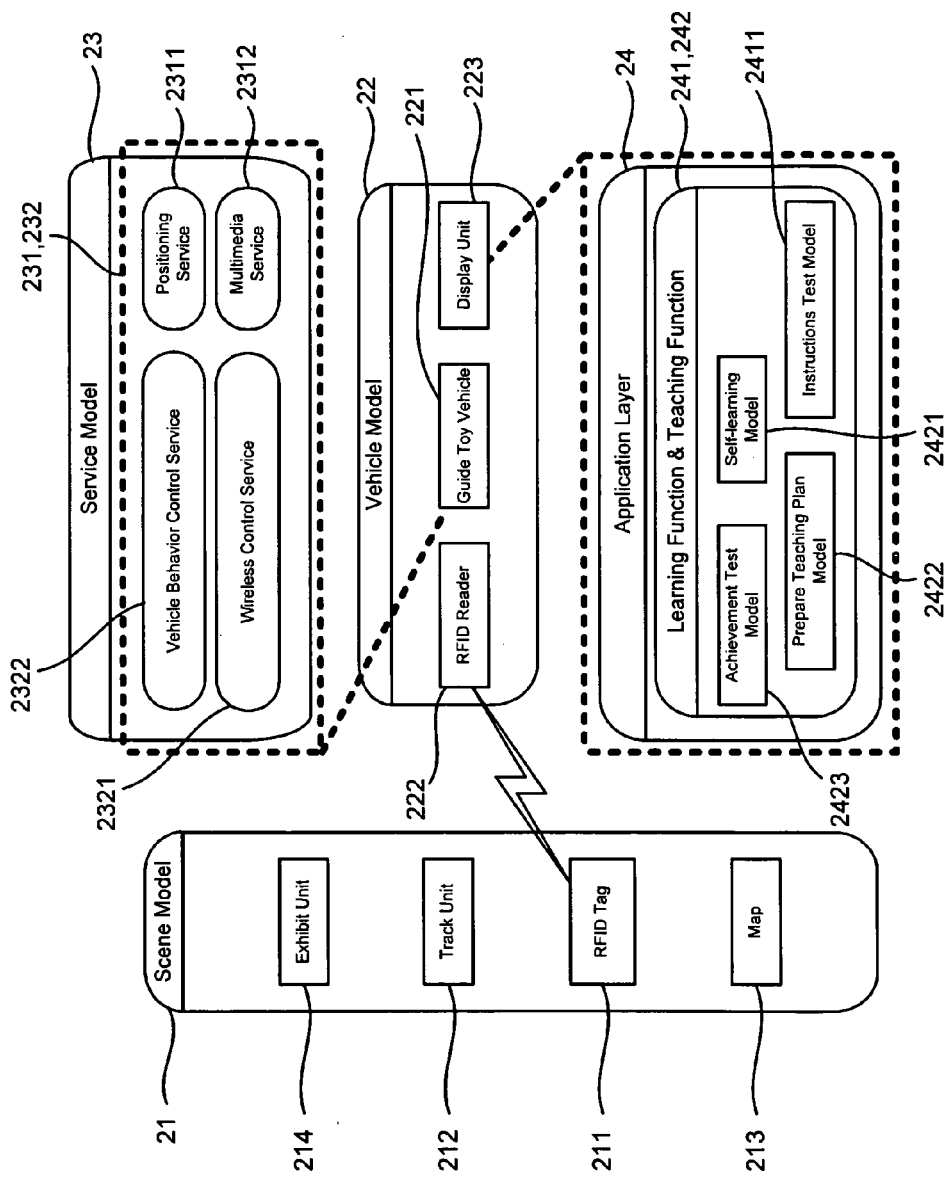
FIG. 3 is the structural view showing the second preferred embodiment.

Please refer to FIG. 1 to FIG. 3 which are a view showing a state of use according to the present invention and structural views showing a first preferred embodiment and a second preferred embodiment. As shown in the figures the present invention is an interactive guide toy vehicle apparatus. A first preferred embodiment 1 is a whole-system architecture, comprising a scene model 11, a vehicle model 12, a guidance system model 13, a service model 14 and an application model 15, where exhibition center services are integrated in a single platform for providing services during guidance without going to actual positions.

The scene model 11 comprises at least one radio frequency identification (RFID) tag 111, a track unit 112, a map 113 and at least one exhibit unit 114.

The vehicle model 12 comprises a guide toy vehicle 121, an RFID reader 122 equipped with the guide toy vehicle 121 and a first wireless network unit 123 where the RFID reader 122 is connected with a personal digital assistant (PDA) through a connection interface, such as CF-Type 2.

The guidance system model 13 plays audio and video; and comprises a display unit 131 and a second wireless network unit 132.

The service model 14 comprises a system service 141 and a guide toy vehicle control service 142, where the system service 141 comprises a web service 1411 a database service 1412, an account service 1413, a multimedia service 1414, an event log service 1415 and a positioning service 1416; and the guide toy vehicle control service 142 comprises a wireless control service 1421 and a vehicle behavior control service 1422.

The application model 15 comprises a teaching function 151, a learning function 152 and an add-on function 153, where the teaching function 151 comprises a system setting model 1511, an instruction test model 1512 and a system maintenance model 1513; the learning function 152 comprises a self-learning model 1521, a prepared teaching plan model 1522 and an achievement test model 1523 and the add-on function 153 comprises a log model 1531 and a positioning model 1532, Thus, with the above structure, a novel interactive guide toy vehicle apparatus is obtained.

On using the present invention, the manually-constructed track unit 112 of the scene model 11 is designed; the exhibit unit 114 is placed at a position on the map 113; and the RFID tag 111 is placed under the track unit 112 around the exhibit unit 114, where the RFID tag 111 is inputted with a certain number to represent the exhibit unit 114. On controlling the guide toy vehicle 121 of the vehicle model 12 through the wireless control service 1421 and the vehicle behavior control service 1422 of the guide toy vehicle control service 142, the guide toy vehicle 121 uses a positioning system provided with RFID and infrared techniques to move along the track unit 112, manually-constructed on the map 113 until arriving at the exhibit unit 114.

The guide toy vehicle 121 recognizes the RFID tag 111 under the exhibit unit 114 through the RFID reader 122. The guidance system model 13 obtains a guidance material 3 according to a relationship set in a back-end management system. Then the guidance material 3 is displayed on the display unit 131 of the guidance system model 13 through the wireless network units 123, 132.

The guidance system model 13 has a lot of options for guidance including showing pictures and printed materials and playing multimedia audio and video (A/V). Regarding the system service 141, the present invention uses the web service 1411 to show target exhibit information on web, where the target exhibit information is shown through pictures, printed materials and multimedia A/V; and event log. An interactive learning and a prior learning can be set with the guidance system model 13. The database service 1412 provides account information. The account service 1413 connects to an account database to show or edit account data or authority. The multimedia service 1414 connects to a target exhibit database to show information of the target exhibit with multimedia for improving results of learning. The event log service 1415 connects to an event database to record a guiding history of the guide toy vehicle 121 in the guidance. The positioning service 1416 prevents thee guide toy vehicle 121 from hitting any obstacle along the track; and the guide toy vehicle 121 can thus modify its route to approach the target exhibit. Therein, the guide toy vehicle 121 uses the wireless control service 1421 of the guide toy vehicle control service 142 to communicate with a wireless control network. Thus, the RFID reader 122 communicates with the display unit 131 at back-end through wireless network; and the vehicle behavior control service 1422 changes motions of the guide toy vehicle 121 through positioning processes and operations like stopping, forwarding, turning right and turning left.

In the other hand, as shown in FIG. 3, a second preferred embodiment 2 is a pocket-size architecture, comprising a scene model 21, a vehicle model 22, a service model 23 and an application model 24, where the scene model 21 comprises at least one RFID tag 211, a track unit 212, a map 213 and at least one exhibit unit 214; the vehicle model 22 comprises a guide toy vehicle 221, an RFID reader 222 equipped with the guide toy vehicle 221 and a display unit 223; the service model 123 comprises a system service 231 and a guide toy vehicle control service 232; the system service 231 comprises a positioning service 2311 and a multimedia service 2312 the guide toy vehicle control service 232 comprises a wireless control service 2321 and a vehicle behavior control service 2322; the application model 24 comprises a teaching function 241 and a learning function 242; the teaching function 241 comprises an instruction test model 2411; and the learning function 242 comprises a self-learning model 2421, a prepared teaching plan model 2422 and an achievement test model 2423. Thus, with the above structure, a novel interactive guide toy vehicle apparatus is obtained.

Figure 4:
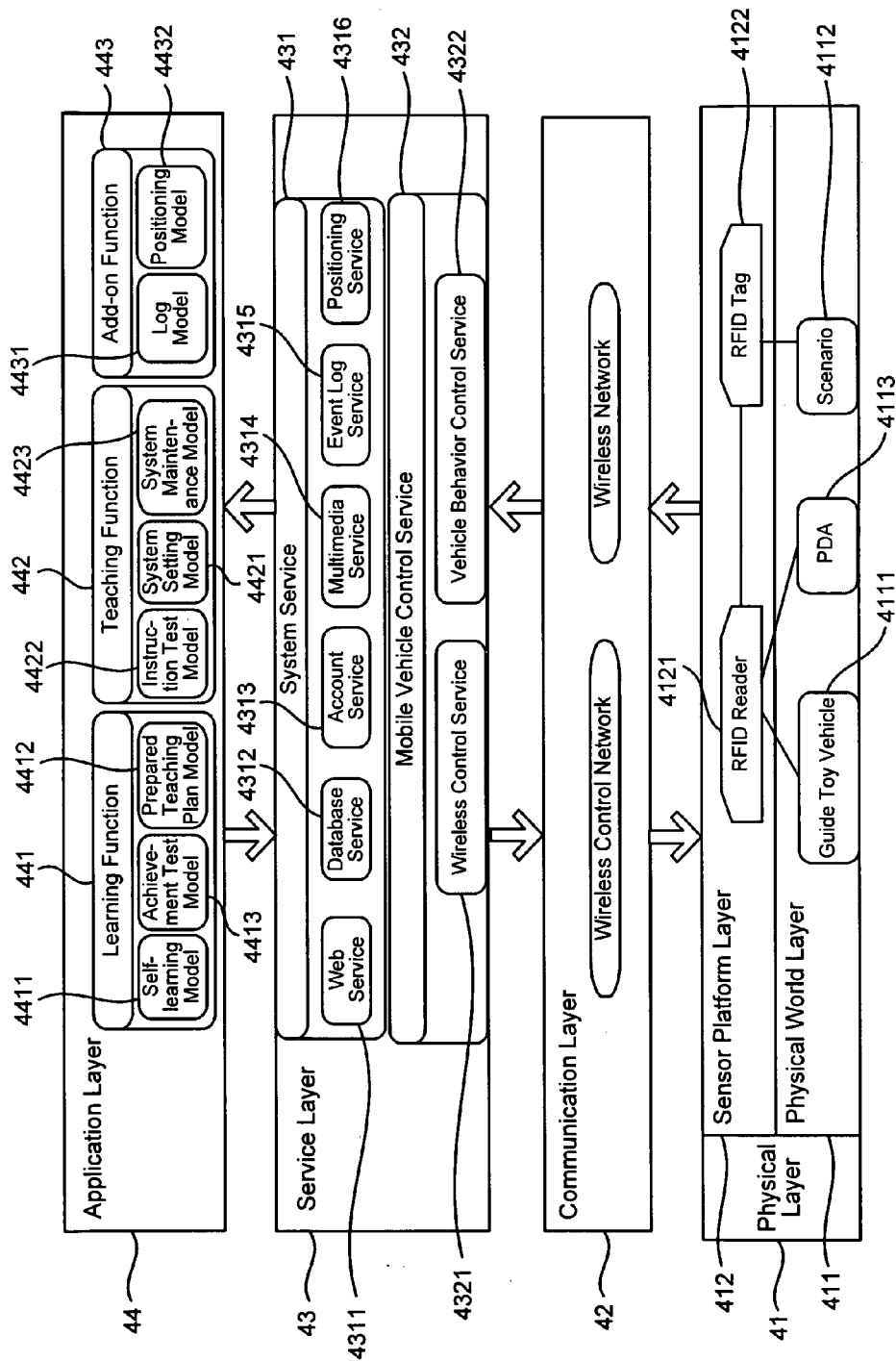
FIG. 4 is the view showing the physical layers.

Please refer to FIG. 4, which is a view showing physical layers. As shown in the figure, the present invention physically comprises a physical layer 41, a communication layer 42 a service layer 43 and an application layer 44.

The physical layer 41 has equipments used in actual environments comprising a physical world layer 411 and a sensor platform layer 412, where the physical world layer 411 uses equipments of a guide toy vehicle 4111, a scenario 4112 and a PDA 4113; and the sensor platform layer 412 uses equipments of an RFID reader 4121 and at least one RFID tag 4122.

The guide toy vehicle 4111 carries the PDA 4113, where the RFID reader 4121 connects to the PDA 4113 through a connection interface for the guide toy vehicle 4111 to receive system control command through the wireless technique. There in the whole system has an environment comprising a map, a track unit, at least one exhibit unit and at least one RFID tag.

The communication layer 42 provides interfaces for the service layer 43 and the physical layer 41, including Wireless Control Network and Wireless Network. Therein, the Wireless Control Network protocol is used to control the guide toy vehicle 4111. After a route for a next stop is figured out for the guide toy vehicle 4111, a control command is sent through the wireless network to change the motion of the guide toy vehicle 4111, like stopping, forwarding, turning right and turning left; or is sent to test the motion of the guide toy vehicle 4111 by an administrator account. The Wireless Network is used to connect the RFID reader 4121 to a back-end computer. After the RFID reader 4121 reads the information of the RFID tag 4122, the information is sent to obtain a location data of the RFID tag 4122 from a database; or the RFID reader 4121 is tested for initializing, closing, reading or writing digital tag data.

The service layer 43 is used to provide specific functions for the application layer 44 and to transmit messages from the communication layer 42, comprising a system service 431 and a guide toy vehicle control service 432, where the system service 431 comprises a web service 4311, a database service 4312, an account service 4313, a multimedia service 4314, an event log service 4315 and a positioning service 4316; and the guide toy vehicle control service 432 comprises a wireless control service 4321 and a vehicle behavior control service 4322.

The application layer 44 provides functions for the system through the service layer 43, comprising a learning function 441, a teaching function 442 and an add-on function 443, where the learning function 441 comprises a self-learning model 4411, a prepared teaching plan model 4412 and an achievement test model 4413; the teaching function 442 comprises a system setting model 4421, an instruction test model 4422 and a system maintenance model 4423; and the add-on function 443 comprises a log model 4431 of learning and a positioning model 4432.

Figure 5:
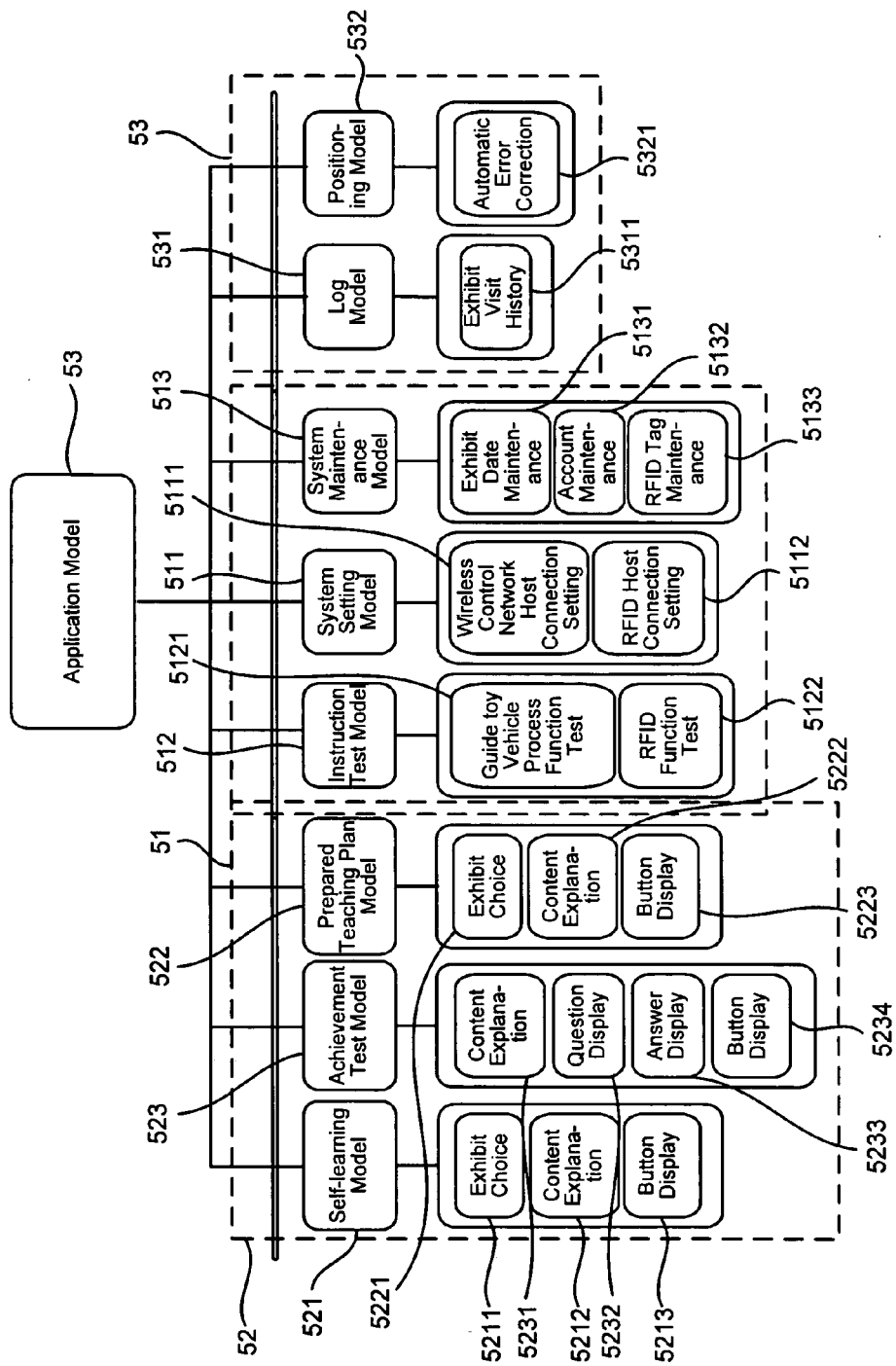
FIG. 5 is the view showing the levels of functions.
Figure 6:
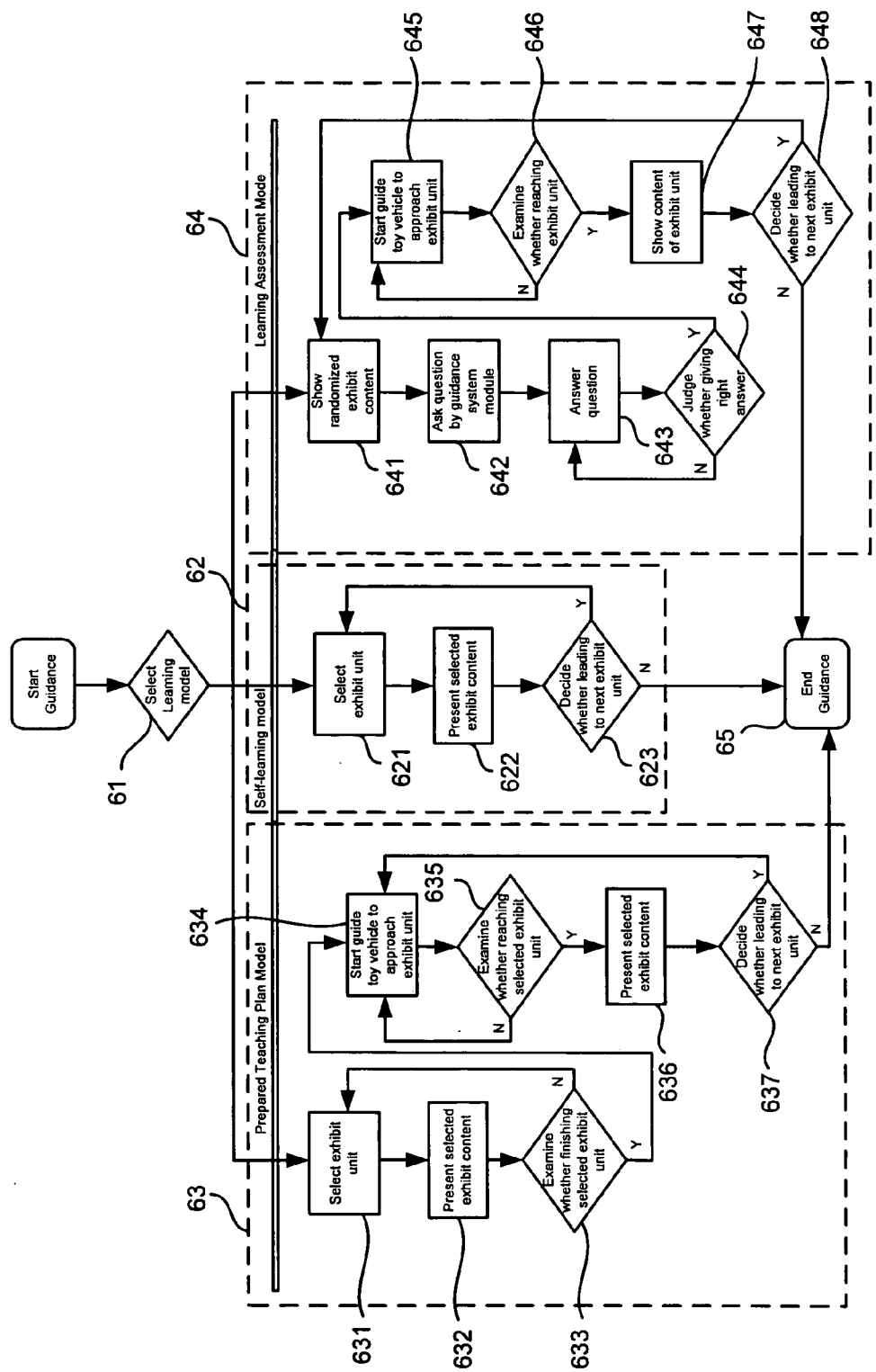
FIG. 6 is the view showing the leaning flow.

Please refer to FIG. 5 and FIG. 6, which are a view showing levels of functions and a view showing a leaning flow. As shown in the figures, an application model in the present invention comprises three functions:

[Function 1]A Learning Function

The learning function 52 provides learning methods, including a self-learning model 521, a prepared teaching plan model 522 and an achievement test model 523, which is freely selected through the following steps:

(a1) Selecting learning mode 61: A learning model is selected.

(b1) Selecting self-learning model 62: If the self-learning model 521, comprising an exhibit choice 5211, a content explanation 5212 and a button display 5213, is selected, contents are shown in audios, videos, pictures or words vividly. The self-learning model 521 is operated through the following steps:

(b11) Selecting exhibit unit 621: An exhibit unit on a map is selected.

(b12) Presenting selected exhibit content 622: A guidance system model shows related information of the exhibit unit.

(b13) Deciding whether leading to next exhibit unit 623: A decision is made on whether leading to next exhibit unit or not. If yes, back to step (b11) if not, go to step (e1) to end guidance.

(c1) Selecting prepared teaching plan model 63: If the prepared teaching plan model 522, comprising an exhibit choice 5221, a content explanation 5222 and a button display 5223, is selected, different contents are displayed in different levels. The contents are selectable to obtain a best learning. If contents for a previous level are well learned, a higher level can be selected. The prepared teaching plan model 522 is operated through the following steps:

- (c11) Selecting exhibit unit 631: An exhibit unit is selected.
- (c12) Presenting selected exhibit content 632: The guidance system model shows related content of the selected exhibit unit.
- (c13) Examining whether finishing selecting exhibit unit 633: Whether selecting an exhibit unit is finished is examined. If yes, start the guidance; if not, go to step (c11) to select an exhibit unit again.
- (c14) Starting guide toy vehicle to approach exhibit unit 634: The guide toy vehicle is started to approach the selected exhibit unit.
- (c15) Examining whether reaching selected exhibit unit 635: Whether the selected exhibit unit is reached is examined. If not, obstacle is cleared off for the guide toy vehicle and go back to step (c14) to re-approach the selected exhibit unit.
- (c16) Presenting selected exhibit content 636: The guidance system model shows related content of the selected exhibit unit.
- (c17) Deciding whether leading to next exhibit unit 623: A decision is made on whether leading to next exhibit unit or not. If yes, back to step (c14) to start the guide toy vehicle for approaching the next exhibit unit; if not, go to step (e1) to end guidance.

(d1) Selecting learning assessment mode 64: If the achievement test model 523 comprising a content explanation 5231, a question display 5232, an answer display 5233 and a button display 5224, is selected, an interactive learning is obtained for learning quickly, confirming achievement and examining learning weakness. Or learning can be redone through the prepared teaching plan model 522. Besides, the achievement test model 523 also provides a reliable base for further improvement. The achievement test model 523 is operated through the following steps:

- (d11) Showing randomized exhibit content 641: A randomized exhibit unit is obtained and contents of the exhibit unit are shown.
- (d12) Asking question by guidance system module 642: The guidance system model asks related question about the exhibit unit.
- (d13) Answering question 643: The question is answered through buttons on the map.
- (d14) Judging whether giving right answer 644: The answer is judged whether the answer is right or not. If a 'wrong' message is fed back go to step (d13) to answer the question again.
- (d15) Starting guide toy vehicle to approach exhibit unit 635: The guide toy vehicle is started to approach the exhibit unit; and the guidance system model shows a message of 'on approaching'.
- (d16) Examining whether reaching exhibit unit 636: Whether the exhibit unit is reached is examined. If not, hindrance is cleared off for the guide toy vehicle and go back to step (d15) to re-approach the selected exhibit unit.
- (d17) Showing content of exhibit unit 647: The guidance system model shows content of the exhibit unit.
- (d18) Deciding whether leading to next exhibit unit 648: A decision is made on whether leading to next exhibit unit or not. If yes, back to step (d11) to start the guide toy vehicle for approaching the next exhibit unit; if not, go to step (e1) to end guidance.
- (e1) Ending guidance 65: The guidance ends.

[Function 2] A Teaching Function

The teaching function 51 provides functions for the administrator account comprising a system setting model 511, an instruction test model 512 and a system maintenance model 513.

With different wire less equipments the system setting model 511 comprises a wireless control network host connection setting 5111 and an RFID host connection setting 5112. Network connections of wireless control network and RFID are set at first. Commands are sent to the guide toy vehicle through the wireless control network host connection setting 5111 and a location of the guide toy vehicle is obtained through the RFID host connection setting 5112. Thus, data of the exhibit unit are normally transmitted between the guide toy vehicle and the guidance system model.

The instruction test model 512 comprises a guide toy vehicle process function test 5121 and an RFID function test 5122. The guide toy vehicle is a self-moving vehicle with an 8051 single-chip controller and a Wireless control network component. Two variable resistances are equipped on tires of the guide toy vehicle. Under the guide toy vehicle process function test 5121, an interactive interface is provided for the guidance system model to test commands for the guide toy vehicle and to judge whether the guide toy vehicle is functioned well. Besides, the RFID comprises the RFID reader and the RFID tag. On assembling the RFID, related hardware information for RFID is learned, including related RFID testing commands of writing, reading and modifying a tag and auto-reading data of the tag.

The system maintenance model 513 comprises an exhibit data maintenance 5131, an account maintenance 5132 and an RFID tag maintenance 5133. Therein, only the administrator account can add or delete course through the exhibit data maintenance 5131. Any user account can only select course and cancel the selection. Yet, every account can select several courses at the same time and cancel any course as one wish. The account maintenance provides the administrator account to manage user accounts, like adding or deleting a user account. The RFID tag maintenance has an interface to manage tag data of the courses, including positioning data of infrared position numbers wireless network position areas, a smart floor, etc., where related information of the exhibit unit can thus be provided.

[Function 3] An Add-On Function

The add-on function 53 provides functions for the administrator account and the user accounts, comprising a log model 531 and a positioning model 532.

The log model 531 comprises an exhibit visit history 5311 to record visit histories of the administrator account and the user accounts. Thus, the administrator account and the user accounts can bypass the visited exhibit units and continue to a new exhibit unit. Besides, the learning histories for the administrator account and the user accounts are obtained along recording the routes passed with the guide toy vehicle.

The positioning model 532 comprises an automatic error correction 5321 to correct route for the guide toy vehicle for approach the exhibit unit while removing obstacle along the route.

To sum up, the present invention is an interactive guide toy vehicle apparatus where exhibition center services are integrated in a single platform for providing services during guidance with out going to actual positions; and, through a multimedia mobile learning guidance system, an user learns knowledge in a happy and pleasant mood for obtaining a further understanding to related materials and for achieving planed learning objects.

The preferred embodiments here in disclosed are not intended to unnecessarily limit the scope of the invention. Therefore, simple modifications or variations belonging to the equivalent of the scope of the claims and the instructions disclosed here in for a patent are all within the scope of the present invention.

What is claimed is:

1. An interactive guide toy vehicle apparatus, comprising;
    a scene model, said scene model comprising at least one radio frequency identification (RFID) tag, a track unit a map and at least one exhibit unit;
    a vehicle model said vehicle model comprising a guide toy vehicle an RFID reader and a wireless network unit, said RFID reader being equipped with said guide toy vehicle;
    a guidance system model, said guidance system model comprising a display unit and a wireless network unit, said guidance system model playing audio and video;
    a service model, said service model comprising a system service and a guide toy vehicle control service; and
    an application model, said application model comprising a teaching function, a learning function and an add-on function.

2. The apparatus according to claim 1, wherein said system service comprises a positioning service, an account service, a multimedia service, a web service, a database service and an event log service.

3. The apparatus according to claim 1, wherein said guide toy vehicle control service comprises a wireless control service and a vehicle behavior control service.

4. The apparatus according to claim 1, wherein said teaching function comprises a system setting model, an instruction test model and a system maintenance model.

5. The apparatus according to claim 1, wherein said learning function comprises an achievement test model, a prepared teaching plan model and a self-learning model.

6. The apparatus according to claim 1, wherein said add-on function comprises a log model and a positioning model.

7. The apparatus according to claim 1, wherein said apparatus physically comprises a physical layer, a communication layer, a service layer and an application layer.

8. The apparatus according to claim 1, wherein said physical layer comprises a physical world layer and a sensor platform layer.

9. An interactive guide toy vehicle apparatus, comprising:
    a scene model, said scene model comprising at least one RFID tag, a track unit, a map and at least one exhibit unit;
    a vehicle model, said vehicle model comprising a guide toy vehicle, an RFID reader and a display unit, said RFID reader being equipped with said guide toy vehicle;
    a service model, said service model comprising a system service and a guide toy vehicle control service; and
    an application model, said application model comprising a teaching function and a learning function.

10. The apparatus according to claim 9, wherein said system service comprises a positioning service and a multimedia service.

11. The apparatus according to claim 9, wherein said guide toy vehicle control service comprises a wireless control service and a vehicle behavior control service.

12. The apparatus according to claim 9, wherein said teaching function comprises an instruction test model.

13. The apparatus according to claim 9, wherein said learning function comprises an achievement test model, a prepared teaching plan model and a self-learning model.

14. The apparatus according to claim 9, wherein said apparatus physically comprises a physical layer, a communication layer, a service layer and an application layer.

15. The apparatus according to claim 14, wherein said physical layer comprises a physical world layer and a sensor platform layer.

* * * * *